March 17, 1942.   V. W. GREEN   2,276,770
ELECTRODE CARRYING ATTACHMENT FOR WELDING MACHINES
Filed June 11, 1940
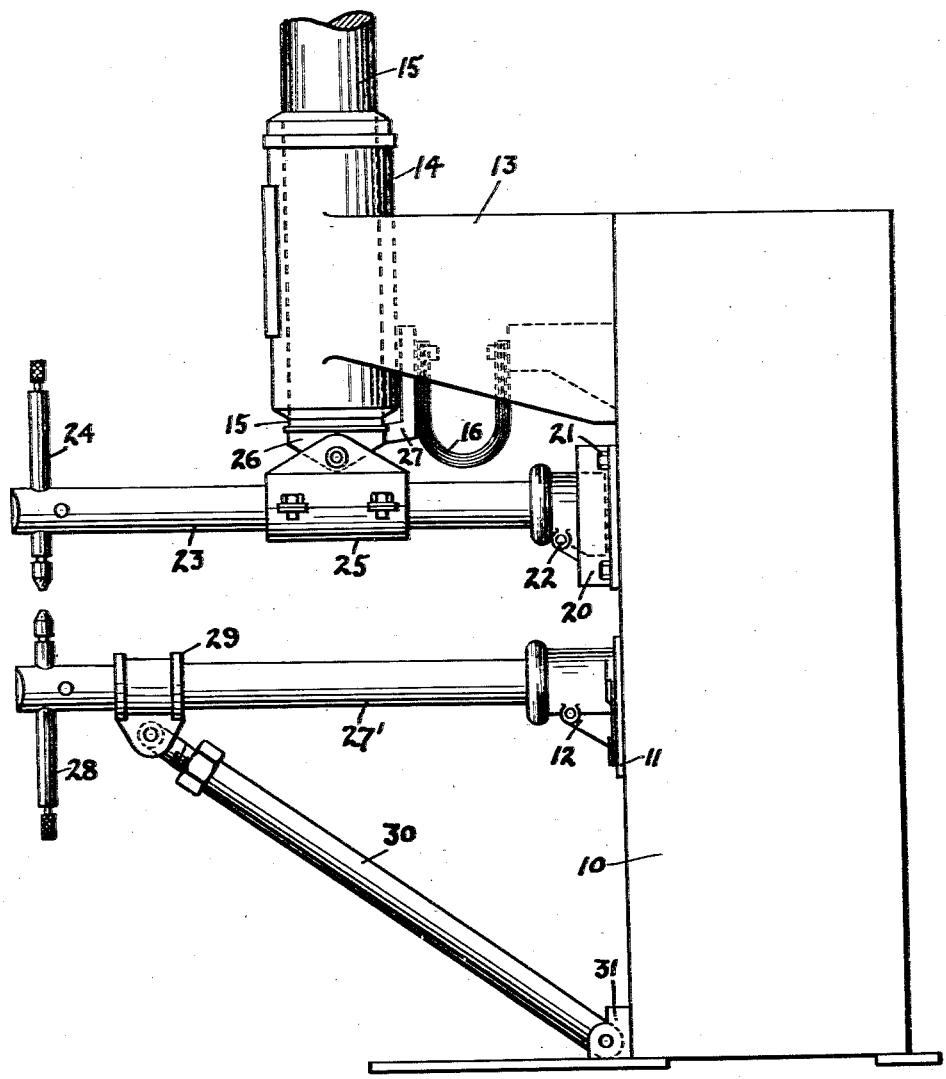
Inventor
V. WAYNE GREEN
By Francis J. Klempay
Attorney Patented Mar. 17, 1942

2,276,770

UNITED STATES PATENT OFFICE 2,276,770

ELECTRODE CARRYING ATTACHMENT FOR WELDING MACHINES

Vernor Wayne Green, Shrewsbury, Mass., assignor to Taylor-Winfield Corporation, Warren, Ohio, a corporation of Ohio Application June 11, 1940, Serial No. 339,895

6 Claims. (Cl. 219—4)

This invention relates to electric welding apparatus and more particularly to an improved arrangement for supporting and operating the electrodes in such apparatus.

The primary object of the invention is, generally stated, the provision of an attachment which may be connected to a press welder of conventional design and which supports the electrodes in an operative manner while greatly increasing the welding throat depth of the apparatus. Thus the invention seeks to materially increase the range of usefulness of a press welder of standard and economical design.

As is well understood in the art, conventional press welders include a normally fixed lower horn carrying the stationary electrode, a movable upper horn carrying the movable electrode, means to conduct welding current to the horns and means to apply welding pressure and movement through the upper horn to the movable electrode. The upper horn is ordinarily carried by a quill or slide which in turn is connected with a suitable pressure applying and electrode moving means. There is a definite limitation on the length of the upper horn which can be placed in a press type spot welding machine of conventional design since excessive binding in the quill or slide and deflection in the horn itself occurs beyond a very limited amount of extension. These difficulties are overcome in accordance with the present invention by pivotally connecting the end of the elongated upper horn to the base or main frame of the welding machine and connecting the slide or quill with the horn intermediate the ends thereof, thus providing in effect a lever of the third class for operating the movable electrode. The lower and normally stationary horn is of a length comparable to that of the upper horn and a suitable brace connecting with the outer end of the same is provided to maintain the lower horn in proper adjusted position.

It is contemplated that the elongated horns and ancillary parts will be so designed that they may readily be attached to a conventional spot welder whereby it is possible to build a combination short throat press welder and a deep throat rocker arm type of machine. By furnishing the necessary auxiliary parts along with the conventional machine it is possible for the user to set up the machine for more efficient operation on various welding tasks. It is, therefore, a further object of the invention to provide a conventional welding machine with few and simply constructed auxiliary attachments whereby the machine may be readily interchanged from a conventional short throat press welder to a deep throat rocker arm type of machine.

The invention further resides in the features of construction, combination of elements, and arrangement of parts, which will be hereinafter more fully explained in the following detailed specification and the accompanying drawing wherein there is specifically disclosed a preferred embodiment of the invention.

The single figure of the drawing represents a side view of a portion of a conventional press type welding machine showing the improved arrangement of the invention for operatively supporting the electrodes.

As illustrated in the drawing and in accordance with usual practice, the welding machine comprises a base or main frame 10 which supports the transformer and other electrical parts of the machine and means to support and operate the electrodes. A fitting 11 is attached to the front face of the frame 10 to receive a socket 12 which is vertically adjustable therein and suitable means (not shown) is provided to lock the socket in adjusted position. Extending outwardly from the front face of the frame is a bracket 13 which carries at its outer end a vertically disposed sleeve 14. Slidably mounted in the sleeve is a slide or quill 15 which is adapted to be connected at its upper end with a suitable pressure applying and electrode moving means of which there are a number of different types, as is well understood in the art.

Fitting 11 and consequently socket 12 is connected with one terminal of the transformer secondary and in accordance with usual practice a short horn carrying an electrode adjacent its outer end is carried by the socket. The lower end of slide 15 is adapted to carry an electrode holder or a holder for a short horn which in turn carries an electrode adjacent its outer end. Such holders are adapted to be connected to the other terminal of the transformer secondary by means of the flexible conductor 16.

In accordance with the preferred embodiment of the present invention, a fitting 20 is attached to the front face of the frame 10 above the fitting 11 by the cap screws 21 which pass through elongated apertures in the flanges of the fitting to enable the vertical position of the fitting to be adjusted. A socket 22 is detachably connected to the fitting 20 by a bayonet slot connection (not shown) or other suitable expedient, the socket 22 being connected to one end of an elongated horn 23, which carries at its outer end an electrode 24. Intermediate the ends of the horn 23 is a clamp 25 pivotally connected with a member 26 which is adapted to be rigidly but detachably connected to the lower end of the slide 15. Member 26 is provided with an extension 27 to which the conductor 16 may be attached.

A lower horn 27' carrying an electrode 28 adjacent its outer end is secured within and projects outwardly from the socket 12 and is provided intermediate its ends with a collar 29 which is pivotally connected with one end of an adjustable brace 30. The latter is connected at its other end with a lug 31 attached to the lower end of the frame 10.

The connection between socket 22 and fitting 20 is sufficiently loose to enable the horn 23 to be moved through its required limited rotational movement about the axis generally coincident with the point of connection between the socket and the fitting. Welding pressure and movement is transmitted by the slide 15 through the member 26, clamp 25 and horn 23 to the electrode 24. It should be observed that by reason of the lever arrangement of the horn 23 there is little or no tendency of the slide 15 to cant or stick in the sleeve 14. The loading is substantially axial at all times.

By the use of the apparatus of the present invention it is possible to convert a short throat press type spot welder into a deep throat welder simply by removing the conventional short horns or the short lower horn and the upper electrode holder, as the case may be, and inserting the converting apparatus in their places. The added connections required at the fittings 20 and 31 may be very readily accomplished. It should be apparent that the combination machine provided by the present invention is capable of a much wider range of use than is either a rocker arm spot welder of conventional design or a standard press type spot welder. For work requiring but a short throat the short horns or the short lower horn and the upper electrode holder may be used, which will result in somewhat more efficient operation of the machine due to the decreased path of travel of the welding current, while for work requiring welds to be made at a substantial interval from an outer periphery of the pieces, the auxiliary attachments specifically described may be utilized.

The above specifically described embodiment of the invention should be considered as illustrative only as obviously many changes may be made therein without departing from the spirit or scope of the invention. For example, the upper arm or horn 23 may be more rigidly pivotally connected to the frame of the machine by a retractable pivot pin and a loosely fitting collar may be placed on the arm and pivotally connected to the lower end of the slide in place of the clamp 25. Reference should therefore be had to the appended claims in determining the scope of the invention.

What I claim is:

1. An electrode carrying attachment for a press type electric spot welding machine having a frame and a longitudinally movable electrode moving member comprising an elongated arm adapted to be pivotally and detachably connected at one end thereof with said frame, a member adapted to be secured to one end of said longitudinally movable member, means pivotally connecting said arm intermediate the ends thereof with said second mentioned member, and means on said arm adjacent the end thereof opposite said pivoted end to support an electrode.

2. An electrode carrying attachment for a press type electric spot welding machine having a frame and a longitudinally movable electrode moving member comprising an elongated arm having one end adapted to be pivotally and detachably connected with said frame, a clamp about said arm intermediate the ends thereof, means on said arm adjacent the outer free end thereof to support an electrode, a second member connected with one end of said longitudinally movable member, a pivotal driving connection between said clamp and said second member, said second member being provided with means to which one end of a flexible conductor may be connected whereby said second member and arm may be electrically connected with one terminal of a source of welding current.

3. Electric welding apparatus comprising in combination a frame, a lower horn support carried by said frame, a movable support on said frame adapted to be actuated by welding pressure applying means and to normally carry an electrode holder, an elongated arm carried by and extending outwardly from said lower horn support and provided at its outer free end with means to support an electrode, a brace connected with said arm intermediate the ends thereof and extending to said frame at a point below said first mentioned support, a second elongated arm pivotally and detachably connected with said frame at a point above said first mentioned support and extending outwardly substantially parallel with said first mentioned arm and having means adjacent its outer free end to support an electrode, a pivotal connection between said second mentioned arm intermediate the ends thereof and said movable member, and means to conduct welding current to said arms.

4. Electric welding apparatus comprising in combination a frame, a lower horn support carried by said frame, a movable support on said frame adapted to be actuated by welding pressure means and to normally carry an electrode holder, an elongated arm carried by and extending outwardly from said lower horn support and having means adjacent its outer free end to retain an electrode, a fitting carried by said frame above said lower horn support, an elongated arm having a fitting at one end thereof adapted to cooperate with said first mentioned fitting to provide a readily detachable connection between said second arm and said frame while allowing limited pivoted movement of said second arm relative to said frame, means adjacent the other end of said second arm to detachably secure an electrode and means to pivotally connect said movable support to said second arm at a point intermediate the ends of said second arm.

5. An attachment for a conventional press type electric spot welding machine having a vertically extending frame and an electrode supporting and actuating member spaced outwardly from and movable generally parallel with the front face of said frame and a normally fixed support carried on said front face of said frame comprising an elongated current conducting arm adapted to be attached at its one end to said normally fixed support and carrying an electrode at its other end, a fitting adapted to be secured to the front face of said frame above said fixed support, a second elongated arm having a fitting at one end thereof adapted to cooperate with said first mentioned fitting to provide a pivotal connection between the parts and having an electrode retaining means adjacent the other end thereof, and means pivotally connecting said first mentioned member with said second mentioned arm intermediate the ends of the latter.

6. An attachment for a conventional press type electric welding machine having a frame and an electrode supporting and actuating member spaced outwardly from said frame and a normally fixed support carried on said frame below said member comprising an elongated arm adapted to be attached to said normally fixed support and carrying an electrode at its outer end, a fitting adapted to be positioned on said frame above said fixed support, a second elongated arm having a fitting at one end thereof adapted to cooperate with said first fitting to provide an operative connection between the parts and having an electrode carrying means adjacent the other end thereof, means connecting said first mentioned member with said second mentioned arm intermediate the ends of the latter whereby the electrodes carried by the outer ends of said arms may be moved toward and away from each other, and a flexible conductor connected with said first mentioned member to conduct welding current through a portion of said second mentioned arm to the electrode carried thereby.

VERNOR WAYNE GREEN.